(12) United States Patent
Klein-Hitpass et al.

(10) Patent No.: US 11,181,188 B2
(45) Date of Patent: Nov. 23, 2021

(54) PLANETARY CARRIER, CASTING METHOD AND PLANETARY GEARING

(71) Applicant: Siemens Aktiengesellschaft, Munich (DE)

(72) Inventors: Arno Klein-Hitpass, Aachen (DE); Kathrin Benoit, Schermbeck (DE); Markus Böggering, Bocholt (DE)

(73) Assignee: Flender GmbH, Bocholt (DE)

( * ) Notice: Subject to any disclaimer, the term of this patent is extended or adjusted under 35 U.S.C. 154(b) by 739 days.

(21) Appl. No.: 16/019,168

(22) Filed: Jun. 26, 2018

(65) Prior Publication Data

US 2018/0372211 A1 Dec. 27, 2018

(30) Foreign Application Priority Data

Jun. 27, 2017 (EP) ..................................... 17177989

(51) Int. Cl.
*F16H 1/28* (2006.01)
*F16H 57/08* (2006.01)
*B22D 27/04* (2006.01)

(52) U.S. Cl.
CPC ......... *F16H 57/082* (2013.01); *B22D 27/045* (2013.01); *F16H 1/28* (2013.01)

(58) Field of Classification Search
CPC .......................................... F16H 57/082
USPC ...................................................... 475/331
See application file for complete search history.

(56) References Cited

U.S. PATENT DOCUMENTS

| 4,719,818 A * | 1/1988 | McCreary ............. F02B 37/105 475/159 |
| 9,677,659 B1 | 6/2017 | Niergarth et al. |
| 2015/0065291 A1 | 3/2015 | Kiesenbauer |
| 2015/0142175 A1 | 5/2015 | Reimers et al. |
| 2015/0239076 A1 | 8/2015 | Klein-Hitpass et al. |
| 2016/0229009 A1 | 8/2016 | Klein-Hitpass et al. |
| 2017/0122296 A1* | 5/2017 | Li .......................... F03D 80/50 |

FOREIGN PATENT DOCUMENTS

| CN | 200986018 Y | 12/2007 | |
| CN | 103447469 A | 12/2013 | |
| CN | 108253125 A * | 7/2018 | |
| DE | 4418693 C1 * | 3/1995 | ........... F16H 57/082 |
| DE | 202012004029 U1 | 5/2012 | |
| EP | 1186804 A1 | 3/2002 | |

(Continued)

OTHER PUBLICATIONS

English translation of EP1186804A1; http://translationportal.epo.org; Mar. 30, 2021 (Year: 2021).*

(Continued)

*Primary Examiner* — Roger L Pang
(74) *Attorney, Agent, or Firm* — Henry M. Feiereisen LLC (57) ABSTRACT

A planetary carrier includes a first hub having an adjoining first sealing wall and a second hub having an adjoining second sealing wall. The first and second sealing walls are arranged opposite each other. The planetary carrier has a web for connecting the first sealing wall to the second sealing wall. A greatest material accumulation of the planetary carrier, at which a greatest Heuvers element of the planetary carrier is located, is radially outside in a region of a transition from the web to the first sealing wall.

10 Claims, 4 Drawing Sheets

(56) References Cited

FOREIGN PATENT DOCUMENTS

EP          1281442  A2    2/2003
WO    WO 2005016576  A1    2/2005

OTHER PUBLICATIONS

Klein-Hitpass et al., U.S. Pat. No. 8,621,940, Jan. 7, 2014, 2012/0067138, Mar. 22, 2012.
Dinter et al., U.S. Pat. No. 8,591,371, Nov. 26, 2013, 2012/0108380, May 3, 2012.
Dinter et al., U.S. Pat. No. 9,151,275, Oct. 6, 2015, 2013/0095972, Apr. 18, 2013.
Dinter et al., U.S. Pat. No. 8,632,437, Jan. 21, 2014, 2013-0088016, Apr. 11, 2013.
Dinter et al., U.S. Pat. No. 8,784,252, Jul. 22, 2014, 2013/0172141, Jul. 4, 2013.
Dinter et al., U.S. Pat. No. 8,591,368, Nov. 26, 2013, 2013-0165288, Jun. 27, 2013.
Boeing et al., U.S. Pat. No. 9,051,922, Jun. 9, 2015, 2014-0302957, Oct. 9, 2014.
Klein-Hitpass et al., U.S. Pat. No. 9,267,864, Feb. 23, 2016, 2013-0180319, Jun. 18, 2013.
Klein-Hitpass et al., U.S. Pat. No. 9,920,830, Mar. 20, 2018, 2017-0175878, Jun. 22, 2017.

\* cited by examiner

PLANETARY CARRIER, CASTING METHOD AND PLANETARY GEARING

CROSS-REFERENCES TO RELATED APPLICATIONS

This application claims the priority of European Patent Application, Serial No. 17177989.5, filed Jun. 27, 2017, pursuant to 35 U.S.C. 119(a)-(d), the disclosure of which is incorporated herein by reference in its entirety as if fully set forth herein.

BACKGROUND OF THE INVENTION

The present invention relates to a planetary carrier for a planetary gearing and to a casting method for producing a cast component, in particular an inventive planetary carrier. The invention also relates to a planetary gearing, which is fitted with a corresponding planetary carrier.

The following discussion of related art is provided to assist the reader in understanding the advantages of the invention, and is not to be construed as an admission that this related art is prior art to this invention.

A method developed by A. Heuvers is known as Heuvers' circle method according to which cast components are configured to counteract a hot cracking tendency. The Heuvers' circle method is based on Chvorinov's rule, which defines a connection between a solidification time of a cast component, its volume and its surface.

Figure 1:
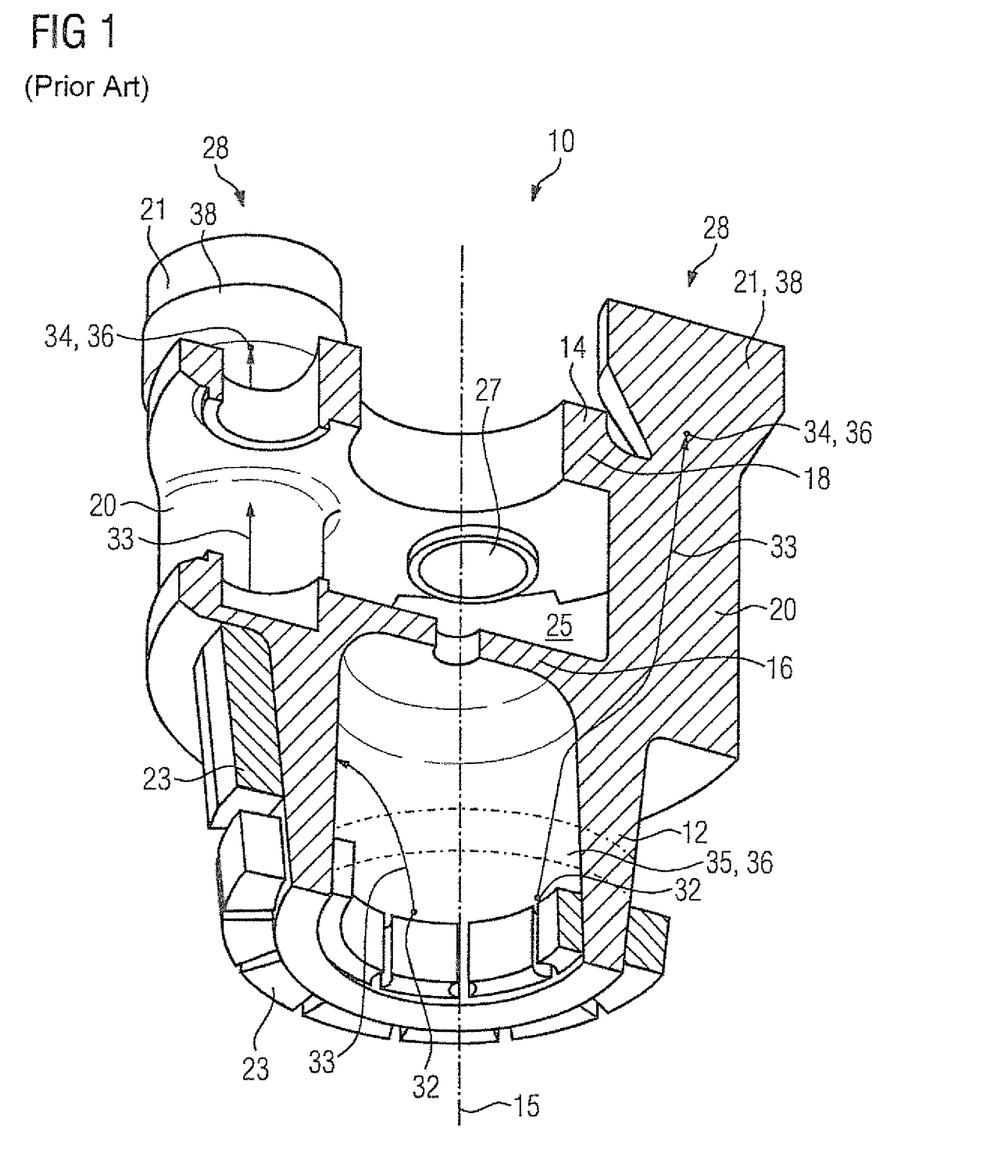
FIG. 1 is a sectional oblique view a solidification phase of a cast planetary carrier during a production method according to the prior art.

FIG. 1 shows a sectional oblique view a solidification phase of a cast planetary carrier 10 during a production method according to the prior art. The planetary carrier 10 includes a first hub 12, which is designed as a long hub 12. A second hub 14, which is designed as a short hub 14, is located on the axially opposite side. An axial direction should here be taken to mean a direction along the main axis of rotation 15 of the planetary carrier 10. The first and second hubs 12, 14 merge into a first and a second sealing wall 16, 18 respectively, which in turn axially delimit an internal space 25. The sealing walls 16, 18 are joined together by webs 20. A hole 27 for accommodating a planetary wheel axis (not shown) is formed in the second sealing wall 18. Furthermore, a plurality of cooling tools 23, namely chills 23, is provided on the first hub 12, and these are designed to purposefully influence the solidification process. Furthermore, two feeders 21 are arranged in the region of the second hub 14, by which melt 28 is thermally influenced during production of the planetary carrier 10.

FIG. 1 also shows two solidification start points 32, from which a solidification front 35 issues. Arrows in each case locally depict the movement 33 of the solidification front 35. The movement 33 of the solidification front 35 ends in each case in a solidification end point 34, which ends inside a feeder 21. The solidification front 35 drives, in other words transports, cavities 36, which in the solidified state locally reduce the material quality in the planetary carrier 10. Once the solidification process has finished, there is locally an increased concentration of cavities in the surroundings of the solidification end points 34. The cavities have for example slag and molding material particles. Flaws 38 are similarly present in the feeder 21 after the solidification process.

One drawback of known casting methods is that, with corresponding cast component geometry, they require the use of cooling tools, for example chills or chill molds, in order to ensure solidification that provides an adequate level of manufacturing quality. The use of cooling tools is expensive and time-intensive.

There is thus a need for cast components, which can be produced quickly and easily and which simultaneously provide a high mechanical load-bearing capacity, as demanded in particular for planetary carriers of planetary gearings.

It would therefore be desirable and advantageous to address these prior art problems and to obviate other prior art shortcomings.

SUMMARY OF THE INVENTION

According to one aspect of the present invention, a planetary carrier includes a first hub, a first sealing wall adjoining the first hub, a second hub, a second sealing wall adjoining the second hub in opposition to the first sealing wall, and a web connecting the first sealing wall to the second sealing wall, wherein a greatest material accumulation of the planetary carrier, at which a greatest Heuvers element of the planetary carrier is located, is radially outside in a region of a transition from the web to the first sealing wall.

In accordance with the present invention, the first and second hubs are designed to mount the planetary carrier in a planetary gearing so as to rotate about a main axis of rotation. Adjoining each of the two hubs is a sealing wall, which is essentially circular and along an axial direction delimits the space in which the planetary wheels are accommodated in the planetary carrier during operation. The sealing walls oppose each other so as to be oriented essentially parallel. Between the sealing walls there is formed at least one web, which is formed in one piece with the first and second sealing walls and connects the two together. In a half-section, viewed along the axial direction, is located the greatest material accumulation of the planetary carrier in a region of the web, which during normal operation of the planetary carrier is subject to reduced mechanical stress. Reduced mechanical stress should be taken to mean stresses, in particular mechanical tensions, which substantially fall below stress limits of the material used for the planetary carrier. In the region of reduced mechanical stress, there is, relative to the planetary carrier as a whole, a reduced utilization of the mechanical carrying capacity of the material used.

The web is advantageously located in a central section of the planetary carrier. During a solidification process during production of the planetary carrier by way of a casting method, there is at least one solidification end point in the region of the greatest material accumulation. Furthermore, a solidification front drives cavities before it, which in a solidified cast component locally reduces the quality of the material used. As a result, there is an increased concentration of cavities in the region of the greatest material accumulation in the claimed planetary carrier. Similarly, in the region of a solidification end point there is the strongest tendency toward the development of flaws, for example shrink holes. The shaping of the inventive planetary carrier allows a region having a reduced material quality to develop during production in a casting method in which the reduced material quality causes only negligible effects on the load-bearing capacity of the planetary carrier during normal operation. Production of a planetary carrier according to the present invention in a casting method requires reduced use of cooling tools, i.e., for example chills and chill molds, or even feeders. The use of cooling tools may even be unnecessary. As a result, a planetary carrier according to the present invention can be produced quickly, cost-efficiently and easily and provides a high level of load-bearing capacity and reliability.

According to another advantageous feature of the present invention, the greatest material accumulation can be located in the region of a transition from the web to one of the sealing walls. As a result, the concept of placement of a region having reduced material quality in a region subject to only low mechanical stress is being pursued. The advantages associated therewith are therefore achieved to an increased extent.

According to another advantageous feature of the present invention, the greatest material accumulation can be in the region of the transition from the web to the first sealing wall, which merges into the first hub. The first hub has a greater length along the axial direction of the planetary carrier than the second hub. The first hub therefore forms a long hub and the second hub a short hub. The transition from web to the first sealing wall is located along the axial direction essentially in a central section of the planetary carrier. As a result, the first sealing wall can have a thicker wall design in the central section than the second sealing wall. A thick-walled first sealing wall provides a high level of stability and serves mechanically as a basis for the thinner-walled components of the planetary carrier formed thereon, such as for example the hubs. The afore-described advantages are achieved to a particular extent in the described embodiment.

According to another advantageous feature of the present invention, the greatest material accumulation can be in a region of the planetary carrier in which there is the lowest mechanical stress during normal operation. The effect of a flaw in connection with a local concentration of cavities lies in a reduction in the mechanical load-bearing capacity of the material used. The region having the lowest mechanical stress therefore provides the greatest reserve in terms of strength, or load-bearing capacity. Mechanical failure of the planetary carrier as a consequence of areas of weakened material due to casting methods is prevented hereby and the reliability of the planetary carrier increased therefore.

According to another advantageous feature of the present invention, the greatest material accumulation can be the region of the planetary carrier in which the greatest Heuvers element can be inscribed. A Heuvers element is a circle or a sphere according to the known Heuvers' inscribed circle method. As a consequence, there is also at least one solidification end point in the region of the greatest material accumulation. During solidification of the shape of the claimed planetary carrier, solidification start points, which form a solidification front, are therefore produced at the axial ends of the hubs and move toward the solidification end points. Heuvers elements of increasing diameter can be inscribed into the shape of the planetary carrier along the path from the solidification start points to the solidification end points. Consequently, a low-shrink-hole or shrink-hole-free solidification is ensured in the hubs, the sealing walls and at least one web, which provides a high material quality. This ensures that the point of the last solidification purposefully occurs in the planetary carrier in the region of the greatest material accumulation, where there is enough material to provide an adequate level of stability despite areas of weakened material. Overall, the application of the Heuvers' inscribed circle method allows the physical separation of regions with increased stress and solidification end points.

According to another advantageous feature of the present invention, the web can have a wall thickness which increases along the axial direction of the planetary carrier from the second hub to the first hub. The web preferably has a solid construction. The web has hereby increasing rigidity in the direction of the first hub. This includes increased flexural rigidity against radial stress of the web as well as increased torsional rigidity. A web wall is preferably formed so as to be essentially inclined with respect to the main axis of rotation of the planetary carrier. The wall thickness of the web consequently increases into the internal space delimited by the sealing walls. This allows the transitions from the sealing walls to the hubs to in each case be formed with increased radii in order to thus reduce stress concentrations and therefore increase the level of utilization of the entire component.

According to another advantageous feature of the present invention, the web can essentially have a truncated pyramid shape or a truncated tetrahedron shape. Alternatively, the web can also essentially have a truncated cone or truncated ellipsoid shape. These truncated shapes are designed to taper toward the second hub. As a result of the truncated pyramid, ellipsoid or tetrahedron shape, there is an opening between webs, and this has a trapezoidal shape. The trapezoidal shape of the openings provides space for assembly of the planetary wheels in the circumferential direction, with a simultaneously high level of rigidity of the webs.

The planetary carrier may advantageously be fitted with a plurality of webs, which connect the first sealing wall to the second sealing wall. Advantageously, an essentially identical angular spacing is established, viewed in cross-section, between the webs in the planetary carrier. As a result, an essentially uniform distribution of rigidity is achieved, and during normal operation. At the same time, an essentially uniform stress distribution is achieved. A concentration of stress in the region of the greatest material accumulation is therefore avoided and mechanical failure counteracted.

According to another advantageous feature of the present invention, at least one wall of a web can have an angle with respect to a main axis of rotation of the planetary carrier which is open in the axial direction. Opposing web walls preferably each have a corresponding angle. The angles of the two opposing web walls are preferably the same size, so a uniform truncated shape of the web is ensured. Alternatively, the two angles can also be different sizes. The angles are chosen in this case as a function of a preferred direction of rotation of the planetary carrier. As a result, the construction of the planetary carrier can also be adapted to structural-mechanical requirements.

According to another aspect of the present invention, a method for producing a cast component includes pouring melt into a prepared mold constructed such that a greatest material accumulation, at which a greatest Heuvers element of the cast component is located, wherein the method is implemented in the absence of a feeder.

The melt poured into the mold may, for example, be a metal material, advantageously cast steel. The mold pre-defines the shape of the cast component to be produced. A suitable shaping of the mold accordingly exists for each shape aspect of the cast component to be produced. Any description of the cast component therefore analogously also applies to the mold. According to the invention, the cast component has its greatest material accumulation in a region which is subject to reduced mechanical stress during operation. Reduced mechanical stresses should here be taken to mean mechanical stresses which are considerably lower than the stress-bearing limit of the material used or material in the solidified and cool state. There is also a solidification end point of the cast component in the region of the greatest material accumulation. A solidification front, which ends at a solidification end point, promotes cavities, of which a locally increased concentration exists in the region of the greatest material accumulation in the solidified state. Similarly, there is an increased tendency for flaws, for example shrink holes, to develop at a solidification end point. A locally increased concentration of cavities in conjunction with flaws leads to restricted rigidity of the material used at the corresponding location.

In a method according to the present invention, the areas of weakened material, which are difficult to predict quantitatively, are purposefully located in a region which is exposed to only reduced mechanical stresses. This region having reduced mechanical stresses thereby provides the maximum reserves of strength, which are partly used up by these areas of weakened material. As a result, the material utilization is in turn locally increased with a cast component, which is produced by means of the inventive method. Furthermore, cooling tools and/or feeders are necessary only to a reduced extent or preferably can be completely dispensed with in the inventive method. The method according to the present invention provides increased level of manufacturing quality for the cast components produced therewith and can be easily and quickly carried out.

According to another advantageous feature of the present invention, the melt is allowed to solidify, wherein after solidification of the melt, the cast component has flaws in a region of the greatest material accumulation. The cast component has flaws in the region of the greatest material accumulation after solidification. The region of the greatest material accumulation is also the region in which the point of last solidification is located. The flaws are areas of weakened material which locally reduce the mechanical load-bearing capacity of the cast component. The shape of the cast component means that this region, where there is the strongest tendency to form flaws, is also located in a region of the lowest mechanical stress. As a result, the areas of weakened material, occurring as a consequence of the flaws, are concentrated in a region where there are sufficient reserves of strength, and therefore there is only a reduced risk of mechanical failure. Furthermore, by means of the claimed method, the occurrence of flaws can be purposefully directed into selected regions of the planetary carrier. The surfaces of the cast component are essentially flat in design. A flat surface presents an advantageous location for non-destructive material testing, for example an ultrasonic test. In particular, the claimed method lets flaws occur in regions whose remote side, in other words, the corresponding back of the cast component, has a likewise essentially flat design. Such locations are advantageous for tools for non-destructive material testing and in cooperation with a flat remote side lead particularly suitable echo surfaces, and this results in accurate evaluation results. The cast components produced with the described method can therefore be designed to be easily inspected, and this further simplifies and accelerates the entire manufacturing process of the cast components.

According to another advantageous feature of the present invention, there can be a plurality of solidification start points at the beginning of solidification, viewed in a half-section of the cast component. Solidification start points protrude in regions having a low solidification module, in other words, the ratio of casting volumes to heat-dissipating casting surface. Solidification start points are therefore located for example in the region of filigree cross-sectional ends. In the claimed method, the solidification, in other words, the solidification front, thereby runs from a plurality of solidification start points to a shared solidification end point, which is located in the region of the greatest material accumulation. The behavior thus described of the solidification front, the solidification start points and end points is based on a model representation in the half-section. The description applies analogously to three-dimensional components, which have a large number of half-sections of this kind, for example essentially rotationally symmetric cast components. Alternatively, a plurality of solidification start points can also each result in a plurality of solidification end points. These solidification end points are spaced apart from each other in regions of separate material accumulations.

According to another advantageous feature of the present invention, the cast component, produced by the method according to the invention, can be a planetary carrier of a planetary gearing. The afore-described advantages of a method according to the invention are achieved to a particular extent with the geometry of a planetary carrier. The technical features of a method according to the invention can therefore be combined with the technical features of a planetary carrier according to the invention. However, the cast component to be produced can also be any gearing component, for example in a spur gearing for industrial applications or for motor vehicles.

According to yet another aspect of the present invention, a planetary gearing includes a planetary carrier, a ring gear, a sun wheel shaft coupled to the planet carrier, and a plurality of planetary wheels rotatably accommodated in the planetary carrier and meshing with the sun wheel shaft, wherein the planetary carrier includes a first hub, a first sealing wall adjoining the first hub, a second hub, a second sealing wall adjoining the second hub in opposition to the first sealing wall, and a web connecting the first sealing wall to the second sealing wall, wherein a greatest material accumulation of the planetary carrier, at which a greatest Heuvers element of the planetary carrier is located, is radially outside in a region of a transition from the web to the first sealing wall. The planetary carrier provides a high level of stability and reliability. The planetary carrier itself is lightweight and therefore allows the weight of the associated planetary gearing to also be reduced. At the same time, the planetary carrier can be produced in a simple casting method in a manner as described above. The casting method can be carried out quickly, reliably and cost-efficiently and guarantees a high manufacturing quality.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 2:
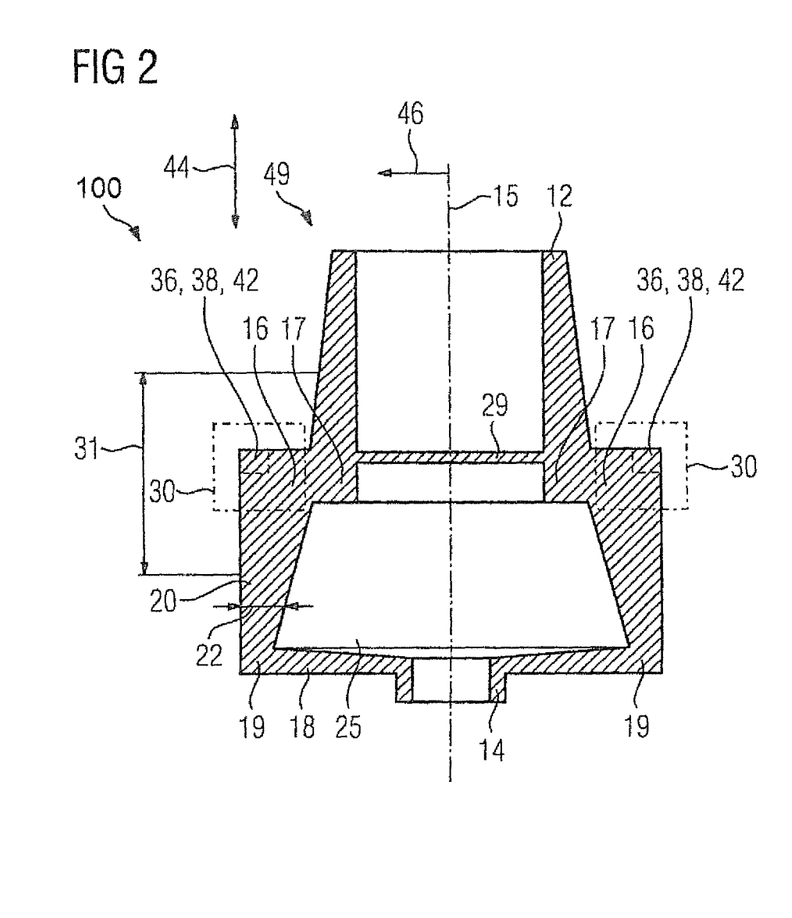
FIG. 2 is a longitudinal section of a planetary carrier according to the present invention.
Figure 3:
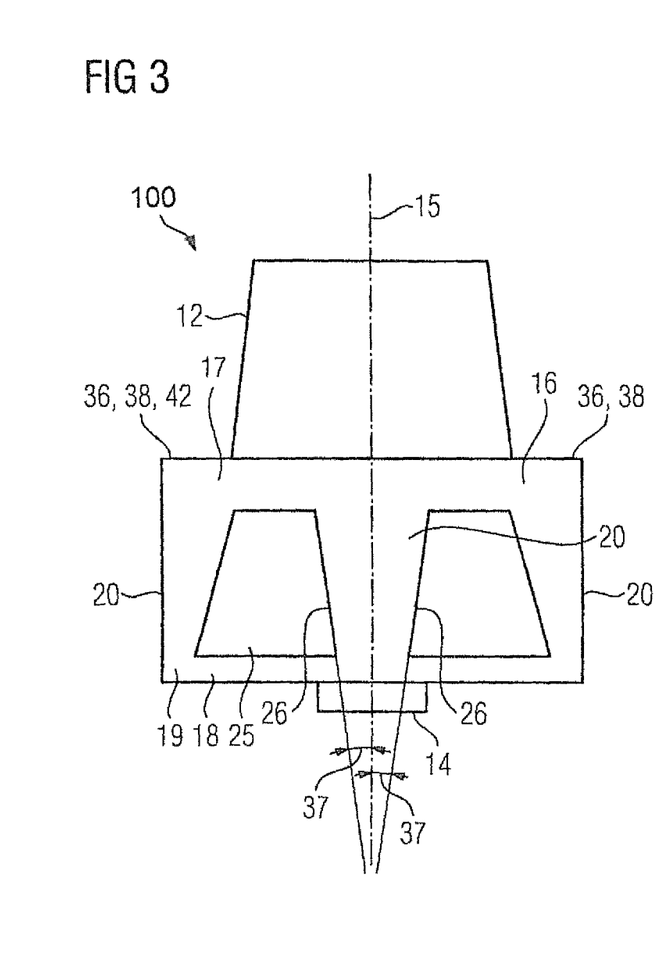
FIG. 3 is a side view of the planetary carrier of FIG. 2.

Turning now to the drawing, and in particular to FIGS. 2 and 3, there are shown a longitudinal section and a side view of a planetary carrier according to the present invention, generally designated by reference numeral 100. The planetary carrier 100 is designed to rotate about a main axis of rotation 15 and includes a first hub 12 and a second hub 14. The first hub 12 is designed as a long hub and the second hub 14 as a short hub. The first hub 12 has a greater wall thickness than the second hub 14. The first hub 12 merges into a first sealing wall 16 and the second hub 14 into a second sealing wall 18. In the region of the first sealing wall 16 there is formed a terminating wall 29 which axially terminates the interior space 25 on one side. The terminating wall 29 is essentially thin in design and suitable for use as a cooling rib during solidification of the melt 28. The two sealing walls 16, 18 are joined together by webs 20. Along an axial direction 44, the sealing walls 16, 18 delimit an interior space 25, which is provided for accommodating planetary wheels (not shown). The interior space 25 is delimited by the webs 20 partially along a radial direction 46. There is a first transition region 17 between the first hub 12, the first sealing wall 16 and the webs 20. There is similarly a second transition region 19 between the second sealing wall 18 and the webs 20.

In FIG. 2, the dashdotted lines designate in the first transition region 17 a greatest material accumulation 30, which encircles a main axis of rotation 15. In the region of the greatest material accumulation 30, there is also a region 42 with a lowest mechanical stress of the planetary carrier 100 during normal operation. The term "mechanical stress" relates hereby the interplay of forces which are exerted on the planetary carrier 100 by a sun wheel shaft (not shown) and planetary wheels (not shown). In the region 42 of the lowest mechanical stress there are flaws 38 which result during production of the planetary carrier 100. Similarly, there is an increased concentration of cavities 36 in the region 42 of the lowest mechanical stress. Flaws 38 as well as cavities 36 are local areas of weakened material of the planetary carrier 100. Because the region 42 of lowest mechanical stress is located at least partly in the region of the greatest material accumulation 30, these local areas of weakened material mean there is only a reduced risk of mechanical failure of the planetary carrier 100 at this location.

The webs 20, which connect the first sealing wall 16 to the second sealing wall 18, have a variable wall thickness 22. The wall thickness 22 of the webs 20 increases from the second hub 14 in the axial direction 44 toward the first hub 12. The position of the greatest material accumulation 30 is defined in an axially central region 31 by the wall thickness 22 that increases in this way. Furthermore, at least one web wall 26 has an angle 37 with respect to the main axis of rotation 15 which is open in the axial direction 44 toward the first hub 12. Due to the wall thickness 22 toward the webs 20 increasing in the direction of the first hub 12 and the angle 37, the webs 20 each have a truncated pyramid shape.

Figure 4:
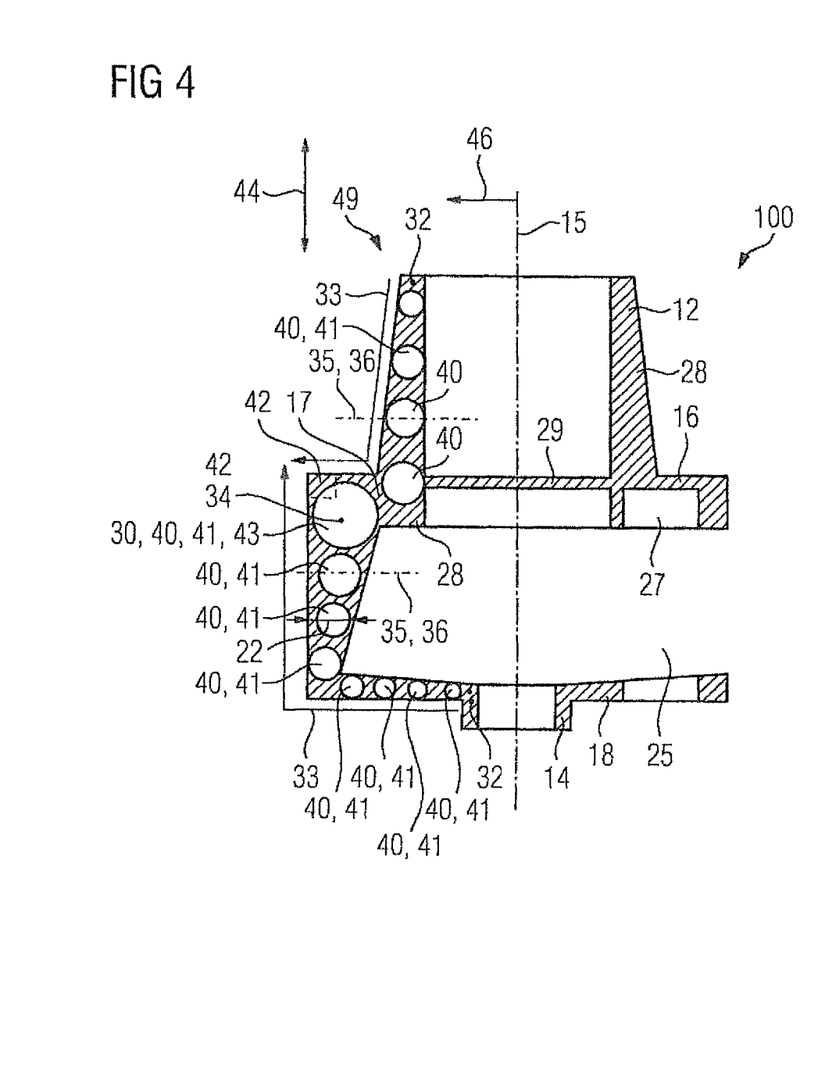
FIG. 4 is a longitudinal section of the planetary carrier of FIG. 2 during a solidification phase of a production method according to the present invention.
Figure 5:
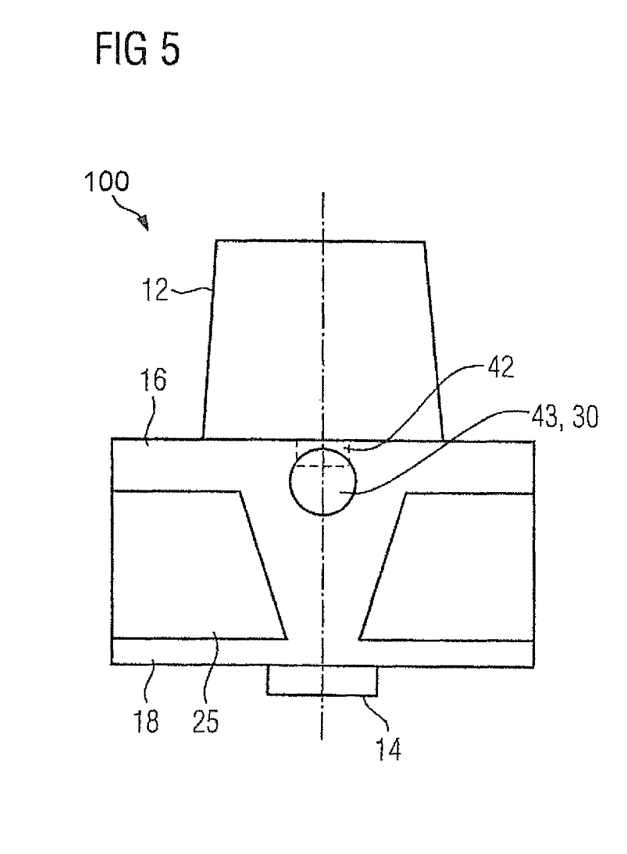
FIG. 5 is a side view of the planetary carrier of FIG. 4.

FIGS. 4 and 5 show in a half-section and a side view a solidification process during production of an embodiment of the planetary carrier 100. FIG. 4 is hereby a longitudinal section of the planetary carrier 100 of FIG. 2 during a solidification phase of a production method according to the present invention and shows a different perspective or in a different sectional plane. Parts corresponding with those in FIG. 2 are denoted by identical reference numerals and have the same technical meaning.

FIGS. 4 and 5 assume that the melt 28, from which the planetary carrier 100 is to be formed, has already been poured in the course of the production method according to the present invention into a mold 49 (not shown), and solidification starts due to the dissipation of heat. In the region of the second hub 14 there is a low solidification module locally, so solidification starts there. A solidification start point 32 results, from which a solidification front 35 forms, which moves through the planetary carrier 100. An arrow depicts the movement 33 of the solidification front 35. Similarly, there is also a low solidification module at one end of the first hub 12, so a solidification start point 32 also forms there. A solidification front 35, whose movement 33 is also depicted by an arrow, also forms starting from the solidification start point 32 in the first hub 12. What are known as Heuvers elements 40 are inscribed in the contour of the planetary carrier 10 along the movement 33 of the solidification front 35. The Heuvers elements 40 in FIG. 4 are Heuvers circles 41, which in turn are two-dimensional projections of the respective Heuvers elements 40. The Heuvers element 40 is a sphere in the three-dimensional space and is inscribed in the contour of the planetary carrier 10. According to Heuvers' inscribed circle method, the Heuvers circle 41 has an increasing diameter along the movement 33 of the solidification front 35. This is brought about inter alia in that the web 20 is essentially formed as a truncated pyramid that increases in size in the direction of the first hub 12. Uniform solidification, and thereby a high material quality, is therefore ensured during production. The solidification front 35 promotes moreover cavities 36 along the movement 33 of the solidification front 35. The two solidification fronts 35, which emanate from the first and second hubs 12, 14, meet in the region of the highest material accumulation 30 in which the largest Heuvers element 43 is present. A solidification end point 34 results, which forms the point of the last solidification. The greatest material accumulation 30 is in the region of the lowest mechanical stress 42 which occurs during normal operation. This occurs radially outwardly in a transition region 17 between the first hub 12 and the adjoining web 20. There are flaws 38 in the solidification end point 34. At the same time, there is an increased concentration of cavities 36 in the region of the solidification end point 34, and these are transported by the solidification fronts 35 to the largest Heuvers element 43. The local area of weakened material in the region 42 of the lowest mechanical stress, present as a consequence of the flaws 38 and cavities 36, lead only to an uncritical reduction in the strength of the planetary carrier 10 at this location.

The solidification of FIG. 4 manages without additional cooling tools, such as for example chills or chill molds, and can therefore be implemented quickly and simply. The planetary carrier 100 in FIG. 4 and FIG. 5 is similarly produced without feeders. Manufacture of the planetary carrier 100 can consequently be implemented cost efficiently. At the same time, the planetary carrier 100 produced in this way provides a high level of strength and reliability.

Figure 6:
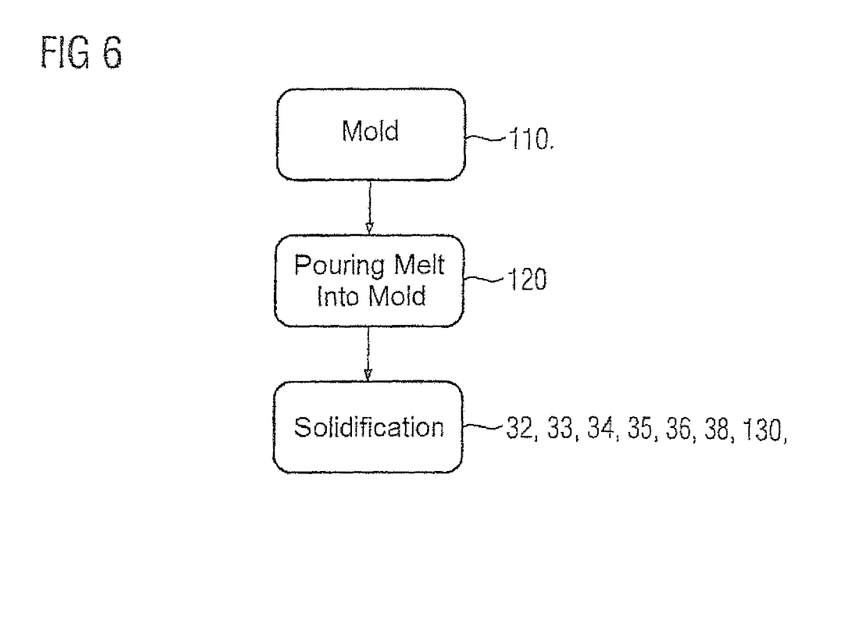
FIG. 6 is a block diagram showing the relationship of components of the production method according to the present invention.

FIG. 6 is a block diagram showing the relationship of components of the production method according to the present invention to illustrate the course of producing a cast component. In a first step 110, a mold (not shown in greater details) is provided, by which the shape of the cast component 50 to be produced is determined. In a second step, melt is poured into the mold. A third step 130 follows in which solidification takes place. Starting from solidification start points 32, solidification fronts 35 are produced. The solidification fronts 35 in turn move toward solidification end points 34, which are in turn located inside the mold of the cast component 50 to be produced. Cavities 36 are transported during the movement 33 of the solidification fronts 35, and after the third step 130 these are present in an increased concentration in the region of the solidification end points 34. Furthermore, flaws 38 result in the region of the solidification end points 34. The flaws 38 and the increased concentrations of cavities 36 are located in at least one region 42 with reduced mechanical stress. There, the areas of weakened material, which are caused by the cavities 36 and the flaws 38, are uncritical to the integrity of the cast component 50.

Figure 7:
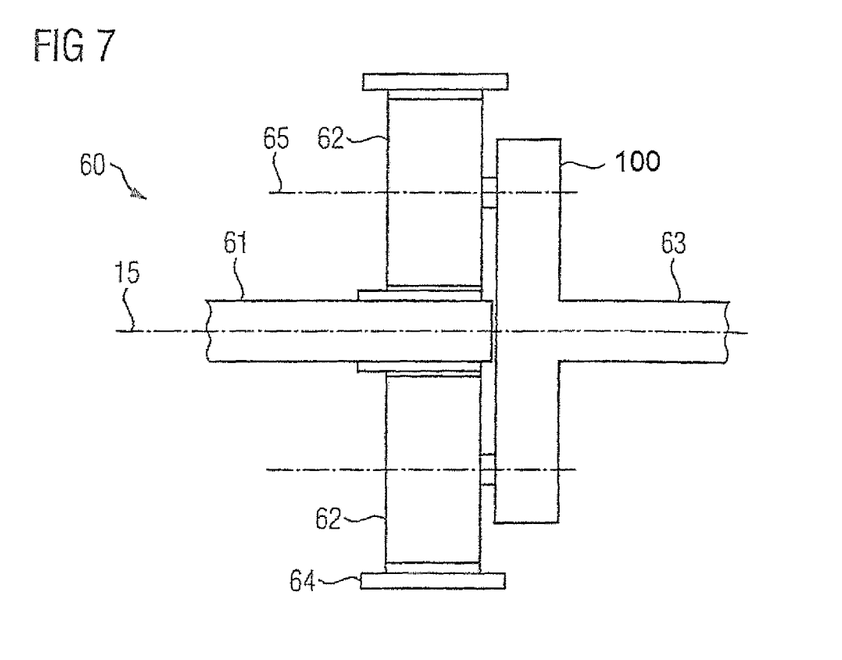
FIG. 7 is a schematic illustration of a planetary gearing according to the present invention.

FIG. 7 is a schematic illustration of a planetary gearing according to the present invention, generally designated by reference numeral 60. The planetary gearing 60 includes a sun wheel shaft 61, which meshes with a plurality of planetary wheels 62. The sun wheel shaft 61 is rotatably mounted about a main axis of rotation 15. The planetary wheels 62 are accommodated in the planetary carrier 10 so as to be rotatable about planetary wheel axes of rotation 65. The planetary wheels 62 mesh with a ring gear 64, which surrounds the planetary wheels 62. The planetary carrier 100 is likewise rotatable about the main axis of rotation 15. Furthermore, an output shaft 63 is connected to the planetary carrier 10.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A planetary carrier, comprising:
 a first hub;
 a first sealing wall adjoining the first hub;
 a second hub;
 a second sealing wall adjoining the second hub in opposition to the first sealing wall; and
 a web connecting the first sealing wall to the second sealing wall, said web having a wall thickness which increases along an axial direction from the second hub to the first hub,
 wherein the first sealing wall, the web and the second sealing wall are formed in one piece.

2. The planetary carrier of claim 1, wherein the web has a web wall which has an angle with respect to a main axis of rotation of the planetary carrier.

3. The planetary carrier of claim 1, wherein the web has a configuration selected from the group consisting of a truncated pyramid, cone, ellipsoid, and tetrahedron shape.

4. The planetary carrier of claim 1, further comprising a plurality of said web to connect the first sealing wall to the second sealing wall.

5. The planetary carrier of claim 4, wherein the webs have each a web wall which extends in relation to a main axis of rotation of the planetary carrier at an angle, with the angles between the main axis of rotation and the web walls differing from one another.

6. A planetary gearing, comprising:
 a planetary carrier;
 a ring gear;
 a sun wheel shaft coupled to the planetary carrier; and
 a plurality of planetary wheels rotatably accommodated in the planetary carrier and meshing with the ring gear,
 wherein the planetary carrier comprises a first hub, a first sealing wall adjoining the first hub, a second hub, a second sealing wall adjoining the second hub in opposition to the first sealing wall, and a web connecting the first sealing wall to the second sealing wall, said web having a wall thickness which increases along an axial direction from the second hub to the first hub, wherein the first sealing wall, the web and the second sealing wall are formed in one piece.

7. The planetary gearing of claim 6, wherein the web has a web wall which has an angle with respect to a main axis of rotation of the planetary carrier.

8. The planetary gearing of claim 6, wherein the web has a configuration selected from the group consisting of a truncated pyramid, cone, ellipsoid, and tetrahedron shape.

9. The planetary gearing of claim 8, wherein the planetary carrier includes a plurality of said web to connect the first sealing wall to the second sealing wall.

10. The planetary gearing of claim 9, wherein the webs have each a web wall which extends in relation to a main axis of rotation of the planetary carrier at an angle, with the angles between the main axis of rotation and the web walls differing from one another.

* * * * *